United States Patent
Khoshnevisan et al.

(10) Patent No.: US 12,225,537 B2
(45) Date of Patent: Feb. 11, 2025

(54) HARQ ACKNOWLEDGMENT FOR SEMI-PERSISTENT SCHEDULING RELEASE DOWNLINK CONTROL INFORMATION

(71) Applicant: QUALCOMM Incorporated, San Diego, CA (US)

(72) Inventors: Mostafa Khoshnevisan, San Diego, CA (US); Yan Zhou, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/302,639

(22) Filed: May 7, 2021

(65) Prior Publication Data

US 2022/0361215 A1 Nov. 10, 2022

(51) Int. Cl.
*H04W 72/12* (2023.01)
*H04L 1/18* (2023.01)
*H04L 1/1812* (2023.01)
*H04W 72/04* (2023.01)
*H04W 72/21* (2023.01)
*H04W 72/23* (2023.01)

(52) U.S. Cl.
CPC .......... *H04W 72/23* (2023.01); *H04L 1/1812* (2013.01); *H04W 72/21* (2023.01)

(58) Field of Classification Search
CPC .... H04W 72/23; H04W 72/21; H04L 1/1812; H04L 5/0094; H04L 1/1854; H04L 1/1896; H04L 1/1614; H04L 5/0055; H04L 1/1861
See application file for complete search history.

(56) References Cited

U.S. PATENT DOCUMENTS

| | | | | |
|---|---|---|---|---|
| 2020/0328849 | A1* | 10/2020 | Noh ................... | H04L 1/1812 |
| 2021/0014026 | A1* | 1/2021 | Papasakellariou .... | H04L 1/1861 |
| 2021/0135946 | A1* | 5/2021 | Babaei ................. | H04L 1/1896 |

(Continued)

FOREIGN PATENT DOCUMENTS

WO 2020264450 A1 12/2020

OTHER PUBLICATIONS

International Search Report and Written Opinion—PCT/US2022/071844—ISA/EPO—Aug. 2, 2022.

(Continued)

*Primary Examiner* — Hoang-Chuong Q Vu
(74) *Attorney, Agent, or Firm* — Harrity & Harrity, LLP

(57) ABSTRACT

Various aspects of the present disclosure generally relate to wireless communication. In some aspects, a user equipment (UE) may receive multiple semi-persistent scheduling (SPS) configurations, the multiple SPS configurations including a first SPS configuration associated with a first control resource set (CORESET) group and a second SPS configuration associated with a second CORESET group. The UE may receive a downlink control information (DCI) message indicating to release one or more SPS configurations of the multiple SPS configurations. The UE may release the one or more SPS configurations in accordance with the DCI message. The UE may transmit hybrid automatic repeat request (HARQ) feedback regarding the DCI message on a selected HARQ feedback resource. Numerous other aspects are described.

30 Claims, 11 Drawing Sheets

(56) References Cited

U.S. PATENT DOCUMENTS

| | | | |
|---|---|---|---|
| 2021/0160879 A1* | 5/2021 | Lin | H04L 1/0003 |
| 2021/0307050 A1* | 9/2021 | Khoshnevisan | H04W 72/51 |
| 2021/0392673 A1* | 12/2021 | Miao | H04W 72/1268 |
| 2022/0030615 A1* | 1/2022 | Saber | H04L 5/0053 |
| 2022/0095337 A1* | 3/2022 | Wang | H04L 5/0055 |
| 2022/0095344 A1* | 3/2022 | Shi | H04L 1/1812 |
| 2022/0104187 A1* | 3/2022 | Zhou | H04L 1/1822 |
| 2022/0116183 A1* | 4/2022 | Gao | H04L 1/1812 |
| 2022/0159667 A1* | 5/2022 | Zhang | H04W 72/0453 |
| 2022/0239358 A1* | 7/2022 | Kim | H04B 7/0456 |
| 2022/0256554 A1* | 8/2022 | Chen | H04W 72/0446 |
| 2022/0321305 A1* | 10/2022 | Xiao | H04L 1/1854 |
| 2022/0322310 A1* | 10/2022 | Laddu | H04W 72/23 |
| 2022/0346104 A1* | 10/2022 | Yi | H04L 1/1812 |
| 2022/0353046 A1* | 11/2022 | Matsumura | H04L 1/1854 |
| 2022/0377717 A1* | 11/2022 | Park | H04L 1/1822 |
| 2022/0393829 A1* | 12/2022 | Kim | H04L 1/18 |
| 2023/0006798 A1* | 1/2023 | Lee | H04L 5/0055 |
| 2023/0041764 A1* | 2/2023 | Park | H04L 5/0053 |
| 2023/0050541 A1* | 2/2023 | Yi | H04L 1/1822 |
| 2023/0056263 A1* | 2/2023 | Kim | H04L 5/005 |
| 2023/0291505 A1* | 9/2023 | Park | H04W 72/11 |
| 2023/0413257 A1* | 12/2023 | Xiao | H04W 72/23 |
| 2023/0413281 A1* | 12/2023 | Park | H04W 72/11 |
| 2024/0023100 A1* | 1/2024 | Sun | H04W 72/0446 |
| 2024/0040587 A1* | 2/2024 | Rastegardoost | H04W 72/232 |

OTHER PUBLICATIONS

NTT DOCOMO, Inc: "Physical Layer Enhancements for DL SPS," 3GPP Draft, 3GPP TSG RAN WG1 #97, R1-1906219, 3rd Generation Partnership Project (3GPP), Mobile Competence Centre, 650, Route Des Lucioles, F-06921 Sophia-Antipolis Cedex, France, vol. RAN WG1. No. Reno, USA, May 13, 2019-May 17, 2019, May 13, 2019 (May 13, 2019), XP051727673, 7 Pages, The Whole Document, Section 2, Section 4 figures 1. 2, Paragraph [0004].

OPPO: "Text Proposals for Enhancements on Multi-TRP and Panel Transmission", 3GPP TSG RAN WG1 #100, R1-2000457, 3rd Generation Partnership Project (3GPP), Mobile Competence Centre, 650, Route Des Lucioles, F-06921 Sophia-Antipolis Cedex, vol. RAN WG1, No. e-Meeting, Feb. 24, 2020-Mar. 6, 2020, Feb. 14, 2020 (Feb. 14, 2020), XP051852867, 17 Pages.

* cited by examiner

HARQ ACKNOWLEDGMENT FOR SEMI-PERSISTENT SCHEDULING RELEASE DOWNLINK CONTROL INFORMATION

FIELD OF THE DISCLOSURE

Aspects of the present disclosure generally relate to wireless communication and to techniques and apparatuses for hybrid automatic repeat request (HARQ) acknowledgment for semi-persistent scheduling (SPS) release downlink control information (DCI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a B S via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving multiple semi-persistent scheduling (SPS) configurations, the multiple SPS configurations including a first SPS configuration associated with a first control resource set (CORESET) group and a second SPS configuration associated with a second CORESET group; receiving a downlink control information (DCI) message indicating to release one or more SPS configurations of the multiple SPS configurations; releasing the one or more SPS configurations in accordance with the DCI message; and transmitting HARQ feedback regarding the DCI message on a selected HARQ feedback resource.

In some aspects, a method of wireless communication performed by a base station includes transmitting multiple SPS configurations, the multiple SPS configurations including a first SPS configuration associated with a first CORESET group and a second SPS configuration associated with a second CORESET group; transmitting a DCI message indicating to release one or more SPS configurations of the multiple SPS configurations; releasing the one or more SPS configurations of the multiple SPS configurations in accordance with the DCI message; and receiving HARQ feedback regarding the DCI message on a selected HARQ feedback resource.

In some aspects, an apparatus for wireless communication includes means for receiving multiple SPS configurations, the multiple SPS configurations including a first SPS configuration associated with a first CORESET group and a second SPS configuration associated with a second CORESET group; means for receiving a DCI message indicating to release one or more SPS configurations of the multiple SPS configurations; means for releasing the one or more SPS configurations in accordance with the DCI message; and means for transmitting HARQ feedback regarding the DCI message on a selected HARQ feedback resource.

In some aspects, an apparatus for wireless communication includes means for transmitting multiple SPS configurations, the multiple SPS configurations including a first SPS configuration associated with a first CORESET group and a second SPS configuration associated with a second CORESET group; means for transmitting a DCI message indicating to release one or more SPS configurations of the multiple SPS configurations; means for releasing the one or more SPS configurations of the multiple SPS configurations in accordance with the DCI message; and means for receiving HARQ feedback regarding the DCI message on a selected HARQ feedback resource.

In some aspects, an apparatus for wireless communication at a UE includes memory, and one or more processors coupled to the memory, the memory including instructions executable by the one or more processors to cause the UE to: receive multiple SPS configurations, the multiple SPS configurations including a first SPS configuration associated with a first CORESET group and a second SPS configuration associated with a second CORESET group; receive a DCI message indicating to release one or more SPS configurations of the multiple SPS configurations; release the one or more SPS configurations in accordance with the DCI message; and transmit HARQ feedback regarding the DCI message on a selected HARQ feedback resource.

In some aspects, an apparatus for wireless communication at a base station includes memory, and one or more processors coupled to the memory, the memory including instructions executable by the one or more processors to cause the base station to: transmit multiple SPS configurations, the multiple SPS configurations including a first SPS configuration associated with a first CORESET group and a second SPS configuration associated with a second CORESET group; transmit a DCI message indicating to release one or more SPS configurations of the multiple SPS configurations; release the one or more SPS configurations of the multiple SPS configurations in accordance with the DCI message; and receive HARQ feedback regarding the DCI message on a selected HARQ feedback resource.

In some aspects, a non-transitory computer-readable medium stores one or more instructions for wireless communication, the one or more instructions, when executed by one or more processors of a UE, cause the UE to: receive multiple SPS configurations, the multiple SPS configurations including a first SPS configuration associated with a first CORESET group and a second SPS configuration associated with a second CORESET group; receive a DCI message indicating to release one or more SPS configurations of the multiple SPS configurations; release the one or more SPS configurations in accordance with the DCI message; and transmit HARQ feedback regarding the DCI message on a selected HARQ feedback resource.

In some aspects, a non-transitory computer-readable medium stores one or more instructions for wireless communication, the one or more instructions, when executed by one or more processors of a base station, cause the base station to: transmit multiple SPS configurations, the multiple SPS configurations including a first SPS configuration associated with a first CORESET group and a second SPS configuration associated with a second CORESET group; transmit a DCI message indicating to release one or more SPS configurations of the multiple SPS configurations; release the one or more SPS configurations of the multiple SPS configurations in accordance with the DCI message; and receive HARQ feedback regarding the DCI message on a selected HARQ feedback resource.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
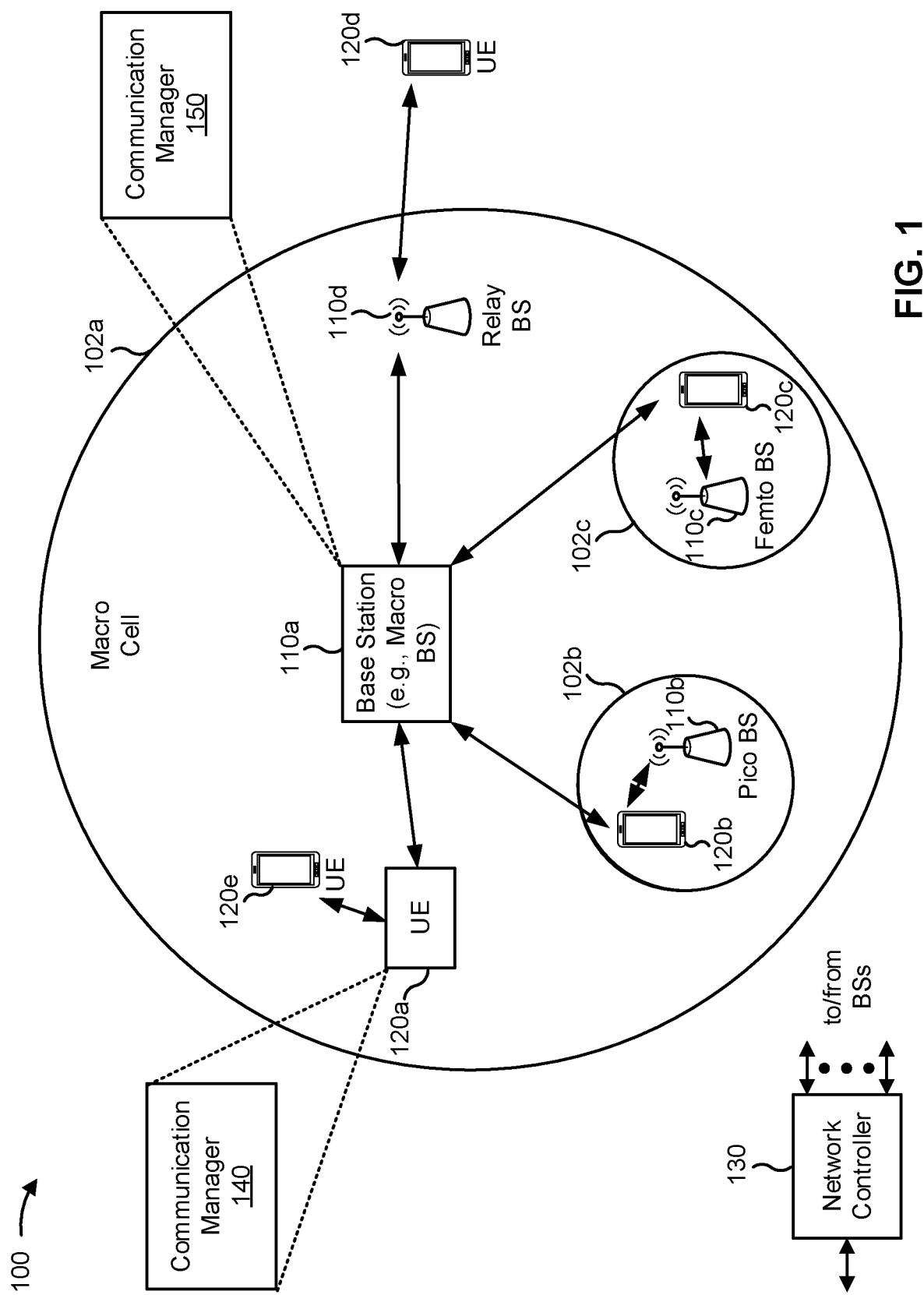
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive multiple SPS configurations, the multiple SPS configurations including a first SPS configuration associated with a first CORESET group and a second SPS configuration associated with a second CORESET group; receive a DCI message indicating to release one or more SPS configurations of the multiple SPS configurations; release the one or more SPS configurations in accordance with the DCI message; and transmit HARQ feedback regarding the DCI message on a selected HARQ feedback resource. Additionally, or alternatively, the communication manager 140 may perform one or more other operations described herein.

In some aspects, the base station 110 may include a communication manager 150. As described in more detail elsewhere herein, the communication manager 150 may transmit multiple SPS configurations, the multiple SPS configurations including a first SPS configuration associated with a first CORESET group and a second SPS configuration associated with a second CORESET group; transmit a DCI message indicating to release one or more SPS configurations of the multiple SPS configurations; release the one or more SPS configurations of the multiple SPS configurations in accordance with the DCI message; and receive HARQ feedback regarding the DCI message on a selected HARQ feedback resource. Additionally, or alternatively, the communication manager 150 may perform one or more other operations described herein.

As indicated above, FIG. 1 is provided as an example. Other examples may differ from what is described with regard to FIG. 1.

Figure 2:
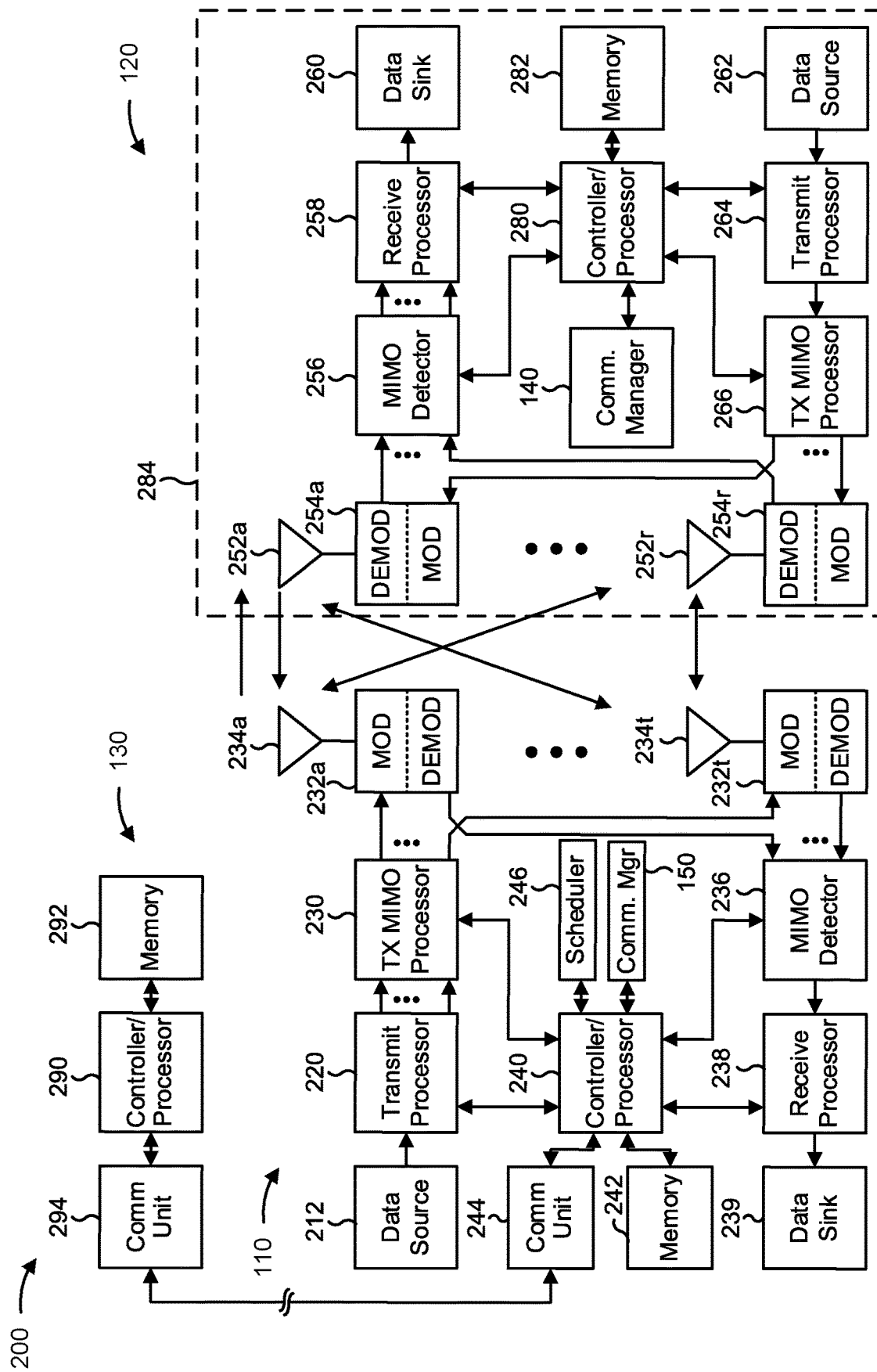
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-9).

Controller/processor 240 of base station 110, controller/processor 280 of UE 120, and/or any other component(s) of FIG. 2 may perform one or more techniques associated with SPS release DCI, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for receiving multiple SPS configurations, the multiple SPS configurations including a first SPS configuration associated with a first CORESET group and a second SPS configuration associated with a second CORESET group; means for receiving a DCI message indicating to release one or more SPS configurations of the multiple SPS configurations; means for releasing the one or more SPS configurations in accordance with the DCI message; and/or means for transmitting HARQ feedback regarding the DCI message on a selected HARQ feedback resource. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for transmitting multiple SPS configurations, the multiple SPS configurations including a first SPS configuration associated with a first CORESET group and a second SPS configuration associated with a second CORESET group; means for transmitting a DCI message indicating to release one or more SPS configurations of the multiple SPS configurations; means for releasing the one or more SPS configurations of the multiple SPS configurations in accordance with the DCI message; and/or means for receiving HARQ feedback regarding the DCI message on a selected HARQ feedback resource. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
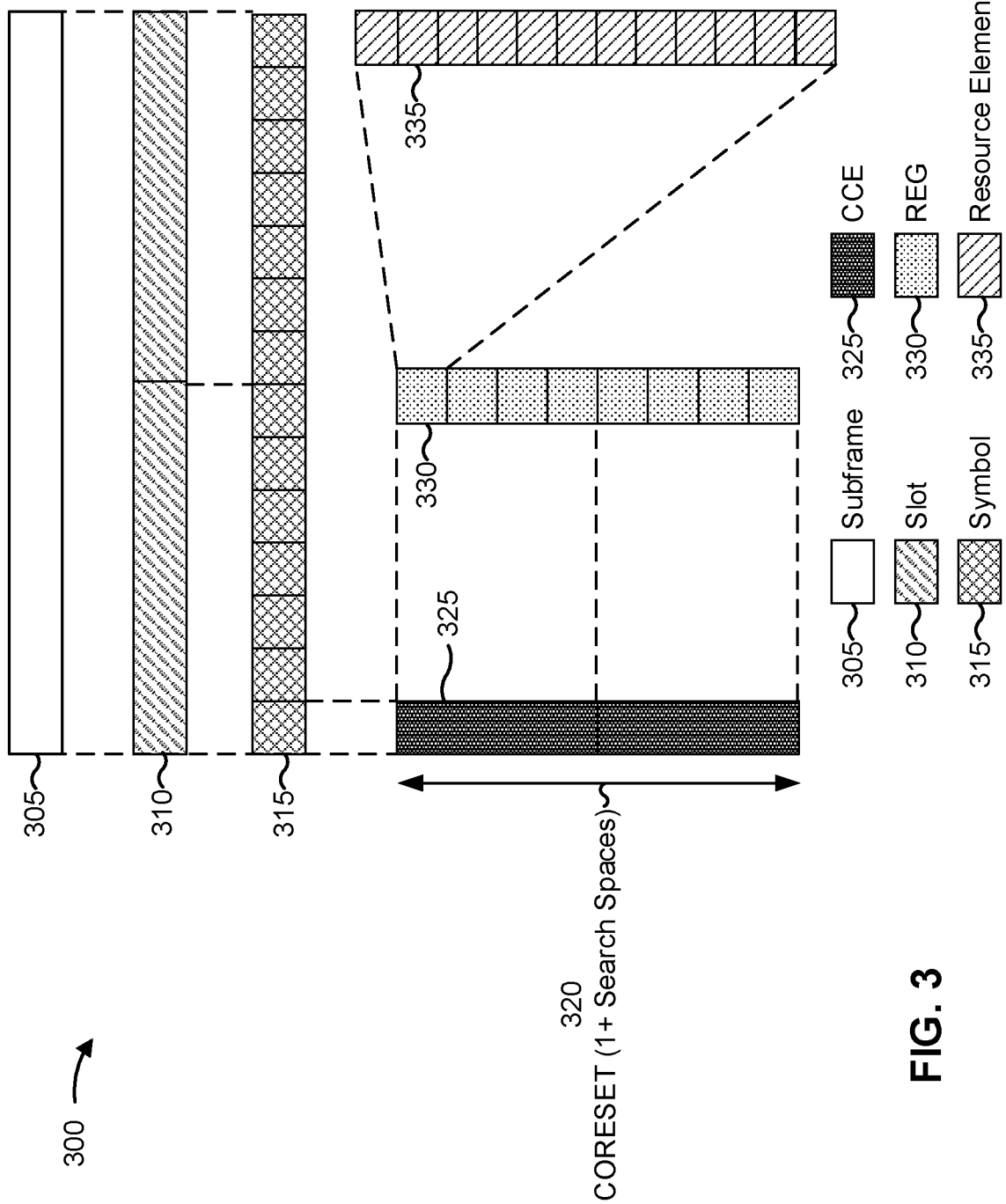
FIG. 3 is a diagram illustrating an example resource structure 300 for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a CORESET 320 and may be structured to support an efficient use of resources, such as by flexible configuration or reconfiguration of resources of the CORESET 320 for one or more PDCCHs and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level. In some aspects, described herein, the DCI may relate to releasing an SPS configuration associated with the CORESET 320 on which the DCI is received and/or another CORESET 320 other than the one on which the DCI is received.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

Figure 4:
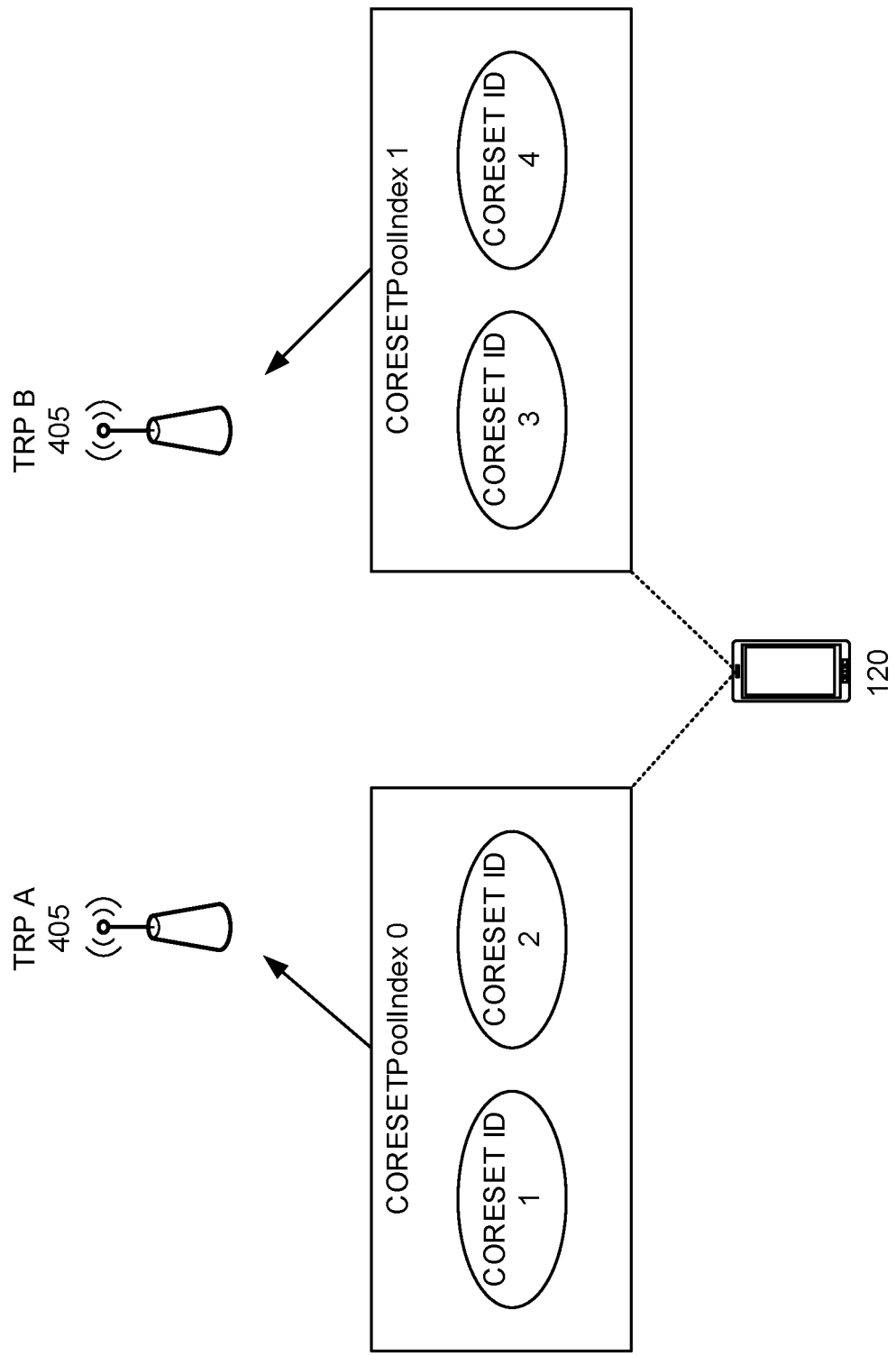
FIG. 4 is a diagram illustrating an example of TRP differentiation at a UE based at least in part on a CORESET pool index, in accordance with the present disclosure.

In some aspects, a CORESET may belong to a CORESET group. CORESET groups may be used, for example, to differentiate a TRP with which a communication is associated. FIG. 4 provides additional description of CORESET groups.

As indicated above, FIG. 3 is provided as an example. Other examples may differ from what is described with respect to FIG. 3.

FIG. 4 is a diagram illustrating an example of TRP differentiation at a UE based at least in part on a CORESET pool index, in accordance with the present disclosure. In some aspects, a CORESET pool index (or CORESET-PoolIndex) value may be used by a UE (a UE 120) to identify a TRP associated with an uplink grant received on a PDCCH.

As illustrated in FIG. 4, a UE 120 may be configured with multiple CORESETs in a given serving cell. Each CORESET configured for the UE 120 may be associated with a CORESET identifier (CORESET ID). For example, a first CORESET configured for the UE 120 may be associated with CORESET ID 1, a second CORESET configured for the UE 120 may be associated with CORESET ID 2, a third CORESET configured for the UE 120 may be associated with CORESET ID 3, and a fourth CORESET configured for the UE 120 may be associated with CORESET ID 4.

As further illustrated in FIG. 4, two or more (for example, up to five) CORESETs may be grouped into a CORESET pool, sometimes referred to herein as a CORESET group. Each CORESET pool may be associated with a CORESET pool index. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a particular TRP 405. As an example, and as illustrated in FIG. 4, a first TRP 405 (TRP A) may be associated with CORESET pool index 0 and a second TRP 405 (TRP B) may be associated with CORESET pool index 1. The UE 120 may be configured by a higher layer parameter, such as PDCCH-Config, with information identifying an association between a TRP and a CORESET pool index value assigned to the TRP. Accordingly, the UE may identify the TRP that transmitted a DCI uplink grant by determining the CORESET ID of the CORESET in which the PDCCH carrying the DCI uplink grant was transmitted, determining the CORESET pool index value associated with the CORESET pool in which the CORESET ID is included, and identifying the TRP associated with the CORESET pool index value.

In some aspects, multiple TRPs 405 may use a multi-DCI based design. In this design, first DCI (transmitted from TRP A 405) may schedule data communications by TRP A 405, and second DCI, transmitted from TRP B 405, may schedule data communications by TRP B 405. The first DCI and the second DCI can be differentiated from each other based at least in part on the CORESET in which the DCI is received. The CORESET pool index of the CORESET in which the DCI is received may be used for various purposes, such as hybrid automatic repeat request (HARQ) feedback. Techniques and apparatuses described herein provide for signaling and interpretation of DCI relating to releasing an SPS configuration in a multi-DCI based design.

As indicated above, FIG. 4 is provided as an example. Other examples may differ from what is described with respect to FIG. 4.

Figure 5:
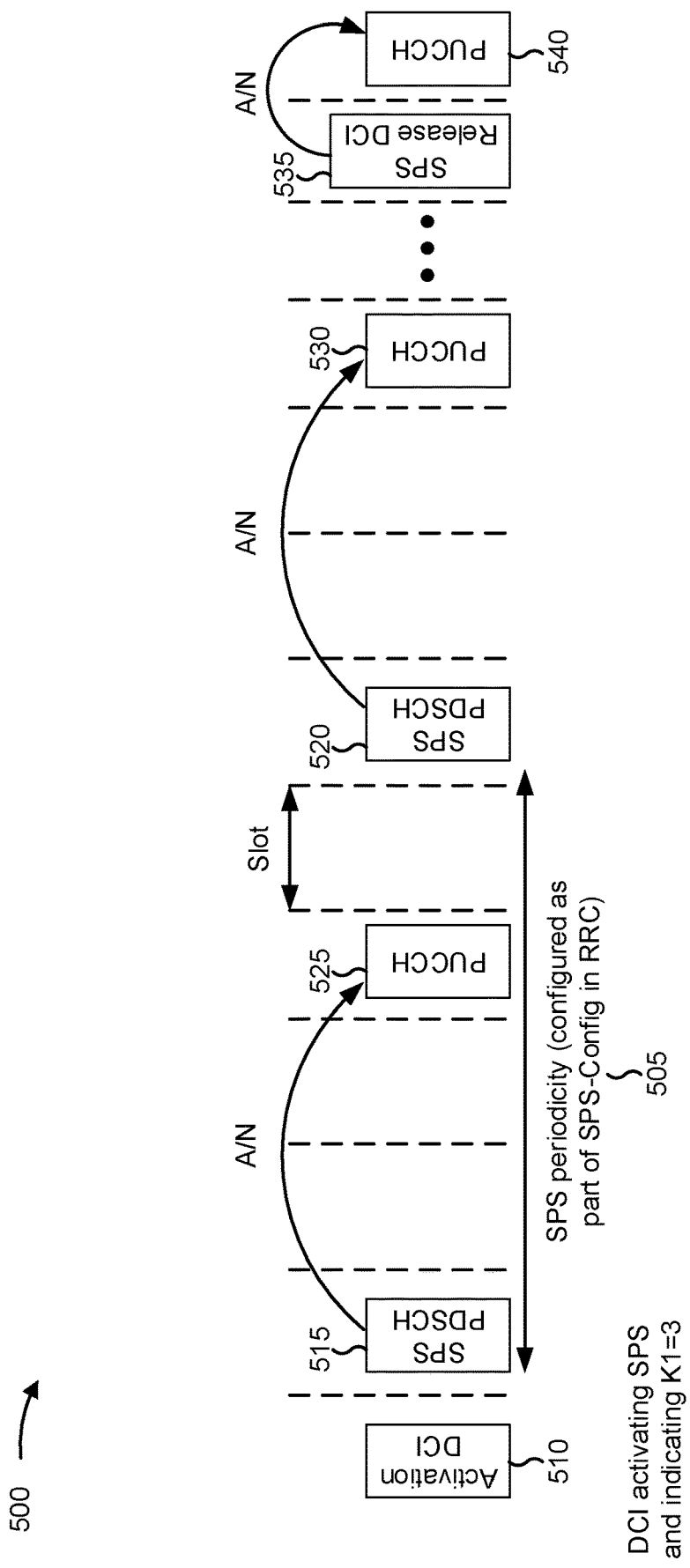
FIG. 5 is a diagram illustrating an example of SPS activation and deactivation, in accordance with the present disclosure.

FIG. 5 is a diagram illustrating an example 500 of SPS activation and deactivation, in accordance with the present disclosure. Example 500 shows communications between a UE (e.g., UE 120) and a base station (e.g., BS 110). The base station may configure one or more SPS configurations. For example, the base station may configure, via radio resource control (RRC) signaling, parameters such as an SPS periodicity (shown in example 500 by reference number 505), a number of associated HARQ processes, or the like.

As shown by reference number 510, the UE may receive SPS activation DCI from the base station. For example, the UE may receive the SPS activation DCI via a PDCCH in a CORESET. The DCI may activate an SPS configuration. Furthermore, the DCI may include one or more parameters for the activated SPS configuration, such as time and frequency (time/frequency) resources for SPS PDSCHs of the activated SPS configuration, a modulation and coding scheme (MCS) for the activated SPS configuration, an offset between receiving an SPS PDSCH and transmitting HARQ feedback (represented by A/N, meaning "acknowledgment/ negative acknowledgment") regarding the SPS PDSCH (that is, a K1 value), or the like. In example 500, the K1 value is 3. Thus, after an SPS PDSCH 515 or 520 is received in a given slot, a PUCCH 525 or 530 carrying HARQ feedback for the SPS PDSCH 515 or 520 is transmitted in a third slot after the given slot. As shown, the SPS PDSCH 515 and the SPS PDSCH 520 are separated from each other by an SPS periodicity, which may be configured via RRC signaling.

As shown by reference number 535, the UE may receive an SPS release DCI. An SPS release DCI indicates to release an activated SPS configuration. Releasing an activated SPS configuration frees the resources used for SPS PDSCHs 515 and 520 and PUCCHs 525 and 530 for other purposes. As shown by reference number 540, the UE may transmit HARQ feedback via a PUCCH regarding the SPS release DCI. A PUCCH resource for the PUCCH may be indicated by the SPS release DCI.

HARQ feedback may be transmitted via a HARQ resource. HARQ feedback may include a HARQ codebook. One type of HARQ codebook is a Type-1 codebook, also referred to as a semi-static HARQ codebook. A semi-static HARQ codebook is configured via RRC signaling and is valid for a given time span. A semi-static HARQ codebook includes negative acknowledgments (NACKs) for non-scheduled slots, which can be contrasted with a dynamic (e.g., Type-2) codebook that only provides feedback for scheduled slots. For the Type-1 codebook, a location in the Type-1 HARQ-ACK codebook for HARQ-ACK information corresponding to a single SPS PDSCH release is the same as for a corresponding SPS PDSCH. In this case, the location of the SPS PDSCH in the Type-1 codebook is based at least in part on a time domain resource allocation (TDRA) of the SPS PDSCH. However, the SPS release DCI does not schedule a PDSCH, so there is no TDRA. As a result, the above rule is needed for the case of Type-1 codebook.

Multiple SPS configurations can be configured for a given component carrier. Each SPS configuration may be configured with an SPS configuration index, a periodicity, and/or other parameters. One SPS release DCI can release (that is, deactivate) multiple SPS configurations in a given component carrier. For example, the indication of multiple SPS configurations in an SPS release DCI may be through a HARQ process number (HPN) field. Each codepoint of the HPN field can be mapped to one or more SPS configuration indexes through an RRC parameter (such as "sps-ConfigDeactivationStateList"). One A/N may be generated in response to detection of the SPS release DCI, even when the SPS release DCI releases multiple SPS configurations. For a Type1 HARQ-ACK codebook, a location in the HARQ-ACK codebook for HARQ-ACK information (e.g., an A/N) corresponding to multiple SPS configuration releases by a single DCI format is the same location as a location for a corresponding SPS PDSCH reception with the lowest SPS configuration index among the multiple SPS PDSCH releases.

In some cases, HARQ feedback may be provided for multi-DCI based multi-TRP designs. In this case, joint feedback can be configured or separate feedback can be configured. In joint feedback, A/Ns for multiple TRPs are carried on the same PUCCH resource (that is, the same HARQ feedback resource). This may be beneficial for ideal backhaul scenarios. "ackNackFeedbackMode=joint" may be configured for a cell group (that is, a group of downlink component carriers whose HARQ-Acks are in the same PUCCH-Cell) and HARQ-Ack mechanisms for carrier aggregation may be reused for CORESETPoolIndex values 0 and 1 in each CC that is configured with multi-DCI based mTRP.

In separate feedback, HARQ feedback for each TRP may be carried on a separate PUCCH resource. Separate feedback can be used for ideal backhaul and non-ideal backhaul. "ackNackFeedbackMode=separate" may be configured for a cell group. HARQ-Ack reporting procedures may be separately performed for CORESETPoolIndex 0 and 1. Component carriers that are not configured with a CORESET-PoolIndex value may be assumed to be part of CORESETPoolIndex value 0. Component carriers that are configured with two CORESETPoolIndex values are considered two times for HARQ-Ack reporting. PUCCH resources that contain HARQ-Ack for different CORESET-PoolIndex values can be in the same slot but may not be overlapping (that is, the PUCCH resources should be time division multiplexed).

The above description of HARQ feedback for a multi-DCI based multi-TRP scenario is applicable for feedback regarding a dynamically scheduled PDSCH. However, separate feedback based HARQ feedback for multi-DCI based multi-TRP communications, in the context of an SPS release DCI, is not well defined. Furthermore, whether one DCI can release two or more SPS configurations associated with different CORESET groups (that is, different CORESET-PoolIndex values) may be unclear. This ambiguity reduces the usability of SPS configuration for different CORESET groups and leads to errors in interpretation of HARQ feedback regarding multi-DCI based multi-TRP communications involving an SPS release DCI, which increases overhead and reduces efficiency of network communications.

Techniques and apparatuses described herein provide for SPS release DCI signaling and HARQ feedback regarding SPS release DCI signaling in the context of SPS configurations associated with multiple CORESET groups for multi-DCI based multi-TRP communications. For example, techniques described herein indicate, for SPS release DCI, whether and how one DCI can release two SPS configurations associated with two CORESET groups (that is, joint release). For the case of separate feedback and multi-DCI based mTRP, where the above joint release is permitted, techniques described herein provide a rule for association of HARQ feedback for the joint SPS release DCI with a CORESET group (such as a CORESETPoolIndex value) so that the UE can determine in which PUCCH resource the HARQ feedback should be reported. In addition, for the case of a semi-static codebook (e.g., Type-1 HARQ-Ack codebook), techniques described herein provide the location of an A/N bit for the SPS release DCI in the codebook. In this way, overhead is reduced, compatibility of SPS configuration with multi-TRP communications is improved, and efficiency of network communications is increased. Some techniques and apparatuses described herein also provide for an SPS release DCI to release different SPS configurations that are associated with different HARQ codebooks having different priorities (that is, an SPS configuration deactivation state can be mapped to multiple SPS configurations with different HARQ codebook identifiers), which improves efficiency and reduces overhead relative to providing multiple SPS release DCIs for SPS configurations associated with different HARQ codebooks having different priorities.

As indicated above, FIG. 5 is provided as an example. Other examples may differ from what is described with regard to FIG. 5.

Figure 6:
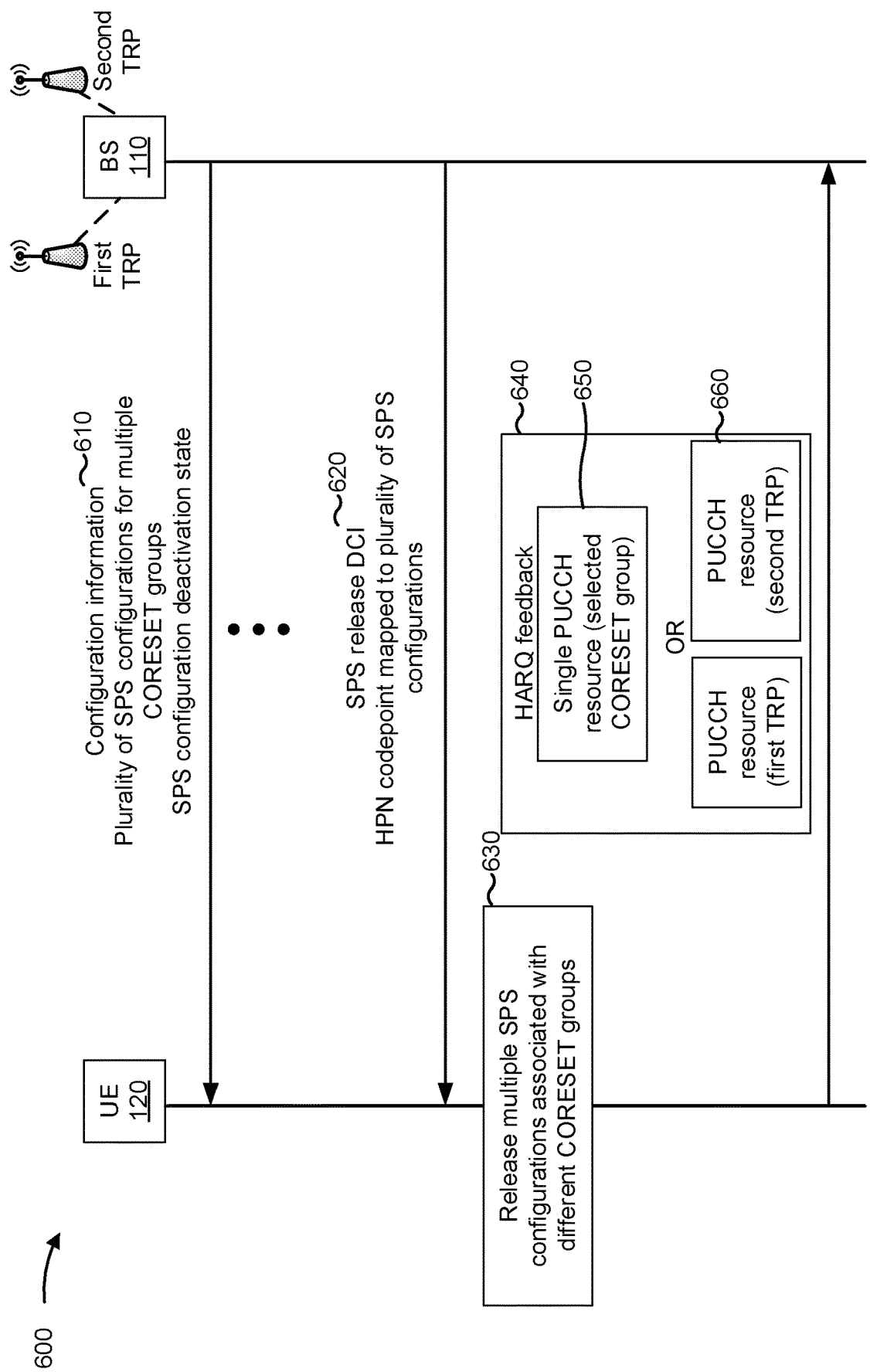
FIG. 6 is a diagram illustrating an example of signaling associated with receiving, processing, and providing feedback regarding an SPS release DCI pertaining to multiple CORESET groups, in accordance with the present disclosure.

FIG. 6 is a diagram illustrating an example 600 of signaling associated with receiving, processing, and providing feedback regarding an SPS release DCI pertaining to multiple CORESET groups, in accordance with the present disclosure. Example 600 includes a UE 120 and a BS 110. In example 600, a single SPS release DCI can release multiple SPS configurations that are associated with different CORESET groups. The BS 110 is associated with a first TRP and a second TRP. Communications between the UE 120 and the BS 110 may be via one or more of the first TRP or the second TRP.

As shown by reference number 610, the BS 110 may provide configuration information to the UE 120. The configuration information may configure a plurality of SPS configurations. For example, the configuration information may configure at least a first SPS configuration associated with a first CORESET group (corresponding to the first TRP) and a second SPS configuration associated with a second CORESET group (corresponding to the second TRP). Furthermore, the configuration information may indicate an SPS configuration deactivation state. An SPS configuration deactivation state indicates a mapping between an HPN field codepoint and a set of SPS configurations to be released. Thus, an SPS release DCI can indicate, via the HPN field, the set of SPS configurations to be released. The configuration information may also configure multiple CORESET groups, such as multiple CORESETPoolIndex values associated with a single component carrier. In example 600, where a single SPS release DCI can release multiple SPS configurations that are associated with different CORESET groups, the SPS configuration deactivation state may indicate a set of SPS configurations including at least one SPS configuration associated with the first TRP and at least one SPS configuration associated with the second TRP.

The UE 120 and the BS 110 may communicate in accordance with one or more of the plurality of SPS configurations, as described in connection with FIG. 5. This communication is not shown in FIG. 6.

As shown by reference number 620, the BS 110 may provide an SPS release DCI to the UE 120. As mentioned, in example 600, the SPS release DCI can release multiple SPS configurations that are associated with different CORESET groups. For example, the SPS release DCI may indicate an HPN that is mapped to the multiple SPS configurations by an SPS configuration deactivation state. As shown by reference number 630, the UE 120 may release (e.g., deactivate) the multiple SPS configurations in accordance with the SPS release DCI.

As shown by reference number 640, the UE 120 may transmit, and the BS 110 may receive, HARQ feedback regarding the SPS release DCI. For example, the UE 120 may transmit HARQ-ACK feedback via a selected HARQ feedback resource (that is, a selected PUCCH resource). In some aspects, shown by reference number 650, the HARQ feedback is associated with a selected CORESET group (that is, a selected CORESETPoolIndex value). In such aspects, the HARQ feedback may be included in a single PUCCH resource (e.g., a single PUCCH resource allocation) that includes HARQ-ACK information bits (that is, HARQ feedback) associated with the selected CORESET group. For example, the HARQ feedback may be associated with a selected CORESETPoolIndex value and may be included in one PUCCH resource that includes HARQ-ACK information bits associated with the selected CORESETPoolIndex value. In some aspects, the selected CORESET group may be selected in accordance with a fixed value (that is, always CORESETPoolIndex 0, always CORESETPoolIndex 1, or the like). In some other aspects, a CORESET group that is associated with an SPS configuration with a lowest index may be selected as the selected CORESET group. In yet other aspects, a CORESET group that is associated with an SPS configuration with a highest index may be selected as the selected CORESET group.

The HARQ feedback may use a semi-static HARQ codebook. A location in the semi-static HARQ codebook for the HARQ feedback may be the same as for a corresponding SPS reception with a lowest SPS configuration index among one or more SPS configurations, of the multiple SPS configurations, that are associated with the selected CORESET group. For example, the location in the Type-1 HARQ-ACK codebook for a HARQ-ACK information bit for the SPS release DCI is the same as for a corresponding SPS reception with the lowest SPS configuration index among the multiple SPS configurations that are associated with the selected CORESETPoolIndex value.

In some aspects, shown by reference number 660, the HARQ feedback is associated with both CORESET groups (e.g., all configured CORESET groups associated with a released SPS configuration). In such aspects, the HARQ feedback may be included in a plurality of PUCCH resources. For example, the HARQ feedback may be included in two PUCCH resources that include HARQ-ACK information bits associated with the first CORESET group and the second CORESET group. In this case, a first PUCCH resource may include HARQ-ACK information bits associated with the first CORESET group and a second PUCCH resource may include HARQ-ACK information bits associated with the second CORESET group. The UE 120 may transmit a first PUCCH on the first PUCCH resource to the first TRP and a second PUCCH on the second PUCCH resource to the second TRP.

As above, the HARQ feedback may use a semi-static HARQ codebook, such as a respective HARQ codebook in each PUCCH resource of the first PUCCH resource and the second PUCCH resource. A location in a given semi-static HARQ codebook for the HARQ feedback may be the same as for a corresponding SPS reception with a lowest SPS configuration index among one or more SPS configurations, of the multiple SPS configurations, associated with a given CORESET group. For example, a location in the first semi-static HARQ codebook for the HARQ feedback may be the same as for a corresponding SPS reception with a lowest SPS configuration index among one or more SPS configurations, of the multiple SPS configurations, associated with the first CORESET group, and a location, in the second semi-static HARQ codebook, for the HARQ feedback may be the same as for a corresponding SPS reception with a lowest SPS configuration index among one or more SPS configurations, of the multiple SPS configurations, associated with the second CORESET group. Thus, the location in the first or second Type-1 HARQ-ACK codebook (reported in the first or second PUCCH resource) for a HARQ-ACK information bit for the SPS release DCI may be the same as for a corresponding SPS reception with the lowest SPS configuration index among the multiple SPS configurations that are associated with the first or second CORESETPoolIndex values, respectively.

In some aspects, the UE 120 may be configured to generate multiple HARQ-ACK codebooks associated with different priorities (such as via a parameter "pdsch-HARQ-ACK-CodebookList"). In this case, one or more first SPS configurations may be associated with a HARQ-ACK codebook associated with a first priority, and one or more second SPS configurations may be associated with a HARQ-ACK codebook associated with a second priority. The SPS release DCI can release different SPS configurations that are associated with different codebooks associated with different priorities. For example, an SPS configuration deactivation state may be mapped to multiple SPS configurations having different HARQ-ACK codebook identifiers. In some aspects, the SPS release DCI can release different SPS configurations that are associated with different HARQ-ACK codebooks associated with different priorities if the SPS configurations are also associated with different CORESET groups. For example, a first SPS configuration associated with a HARQ-ACK codebook having a first priority may be associated with a first CORESET group, and a second SPS configuration associated with a HARQ-ACK codebook having a second priority may be associated with a second CORESET group. In other words, an SPS release DCI can release different SPS configurations that are associated with different codebooks associated with different priorities (i.e., a state can be mapped to multiple SPS configurations with different harq-CodebookIDs). In some aspects, the SPS release DCI can release the different SPS configurations if the different SPS configurations are mapped to the same state (thus, can be released by the same SPS release DCI), are associated with different harq-CodebookIDs, and are also associated with different CORESETPoolIndex values. It should be noted that the techniques described here, by which the SPS release DCI can release different SPS configurations associated with different priorities, can be used independently of example 600.

As indicated above, FIG. 6 is provided as an example. Other examples may differ from what is described with regard to FIG. 6.

Figure 7:
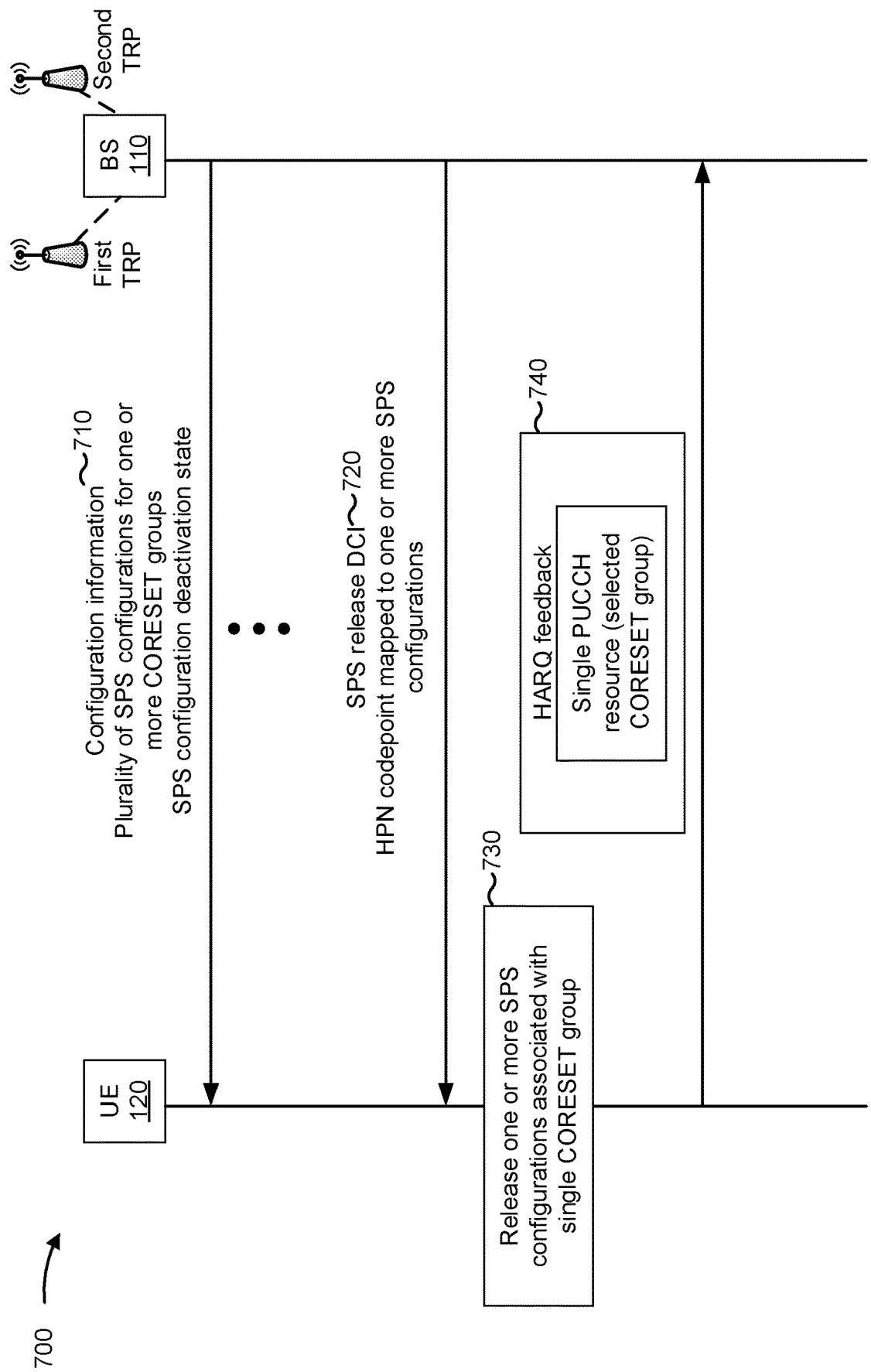
FIG. 7 is a diagram illustrating an example of signaling associated with receiving, processing, and providing feedback regarding an SPS release DCI pertaining to multiple CORESET groups, in accordance with the present disclosure.

FIG. 7 is a diagram illustrating an example 700 of signaling associated with receiving, processing, and providing feedback regarding an SPS release DCI pertaining to multiple CORESET groups, in accordance with the present disclosure. Example 700 includes a UE 120 and a BS 110. In example 700, a single SPS release DCI cannot release multiple SPS configurations that are associated with different CORESET groups. The BS 110 is associated with a first TRP and a second TRP. Communications between the UE 120 and the BS 110 may be via one or more of the first TRP or the second TRP.

As shown by reference number 710, the BS 110 may provide configuration information to the UE 120. The configuration information may configure a plurality of SPS configurations. For example, the configuration information may configure at least a first SPS configuration associated with a first CORESET group (corresponding to the first TRP) and a second SPS configuration associated with a second CORESET group (corresponding to the second TRP). Furthermore, the configuration information may indicate an SPS configuration deactivation state. An SPS configuration deactivation state indicates a mapping between an HPN field codepoint and a set of SPS configurations to be released. Thus, an SPS release DCI can indicate, via the HPN field, the set of SPS configurations to be released. The configuration information may also configure multiple CORESET groups, such as multiple CORESETPoolIndex values associated with a single component carrier.

In some aspects, where a single SPS release DCI cannot release multiple SPS configurations that are associated with different CORESET groups, the SPS configuration deactivation state may indicate a set of SPS configurations that are all associated with the same CORESET group. For example, in the configured sps-ConfigDeactivationStateList, if a state is mapped to multiple SPS configurations, each of these SPS configurations are associated with the same CORESETPoolIndex value. In some other aspects, where a single SPS release DCI cannot release multiple SPS configurations that are associated with different CORESET groups, the SPS configuration deactivation state may indicate a set of SPS configurations associated with multiple CORESET groups, and deactivation of at least part of the set of SPS configurations may be handled based at least in part on a CORESET group in which SPS release DCI is received, as described elsewhere herein.

The UE 120 and the BS 110 may communicate in accordance with one or more of the plurality of SPS configurations, as described in connection with FIG. 5. This communication is not shown in FIG. 7.

As shown by reference number 720, the BS 110 may provide an SPS release DCI to the UE 120. As mentioned, in example 700, the SPS release DCI cannot release multiple SPS configurations that are associated with different CORESET groups. As one example, the SPS release DCI may indicate an HPN that is mapped to SPS configurations associated with only one CORESET group by an SPS configuration deactivation state. As another example, the SPS release DCI may release SPS configurations that are associated with a same CORESET group as a CORESET on which the SPS release DCI is received. For example, the SPS release DCI received on a CORESET with a given CORESETPoolIndex value may only release SPS configurations that are associated with the given CORESETPoolIndex value (and not the other CORESETPoolIndex value). In some aspects, if the association of the SPS release DCI with CORESETPoolIndex value is given by RRC signaling per SPS configuration, only the SPS configurations associated with the CORESETPoolIndex of the CORESET in which the DCI is received are released. In some aspects, the association of the SPS release DCI with the CORESETPoolIndex value depends on the CORESET in which the DCI is received. In such aspects, each SPS configuration index does not have a fixed or predetermined association with a given CORESETPoolIndex value and can change by the SPS release DCI. In other words, the reception of the SPS release DCI itself determines the association. As shown by reference number 730, the UE 120 may release (e.g., deactivate) a set of SPS configurations in accordance with the SPS release DCI.

As shown by reference number 740, the UE 120 may transmit, and the BS 110 may receive, HARQ feedback regarding the SPS release DCI. For example, the UE 120 may transmit HARQ-ACK feedback via a selected HARQ feedback resource (that is, a selected PUCCH resource). The selected HARQ feedback resource may be associated with the selected CORESET group. For example, the selected HARQ feedback resource may be a PUCCH resource that includes HARQ-ACK information bits associated with a CORESETPoolIndex value for which the set of SPS configurations were released. In this case, a location of the HARQ-ACK in a semi-static HARQ codebook may be the same as for a corresponding SPS reception with the lowest SPS configuration index among the released SPS configurations.

As indicated above, FIG. 7 is provided as an example. Other examples may differ from what is described with regard to FIG. 7.

Figure 8:
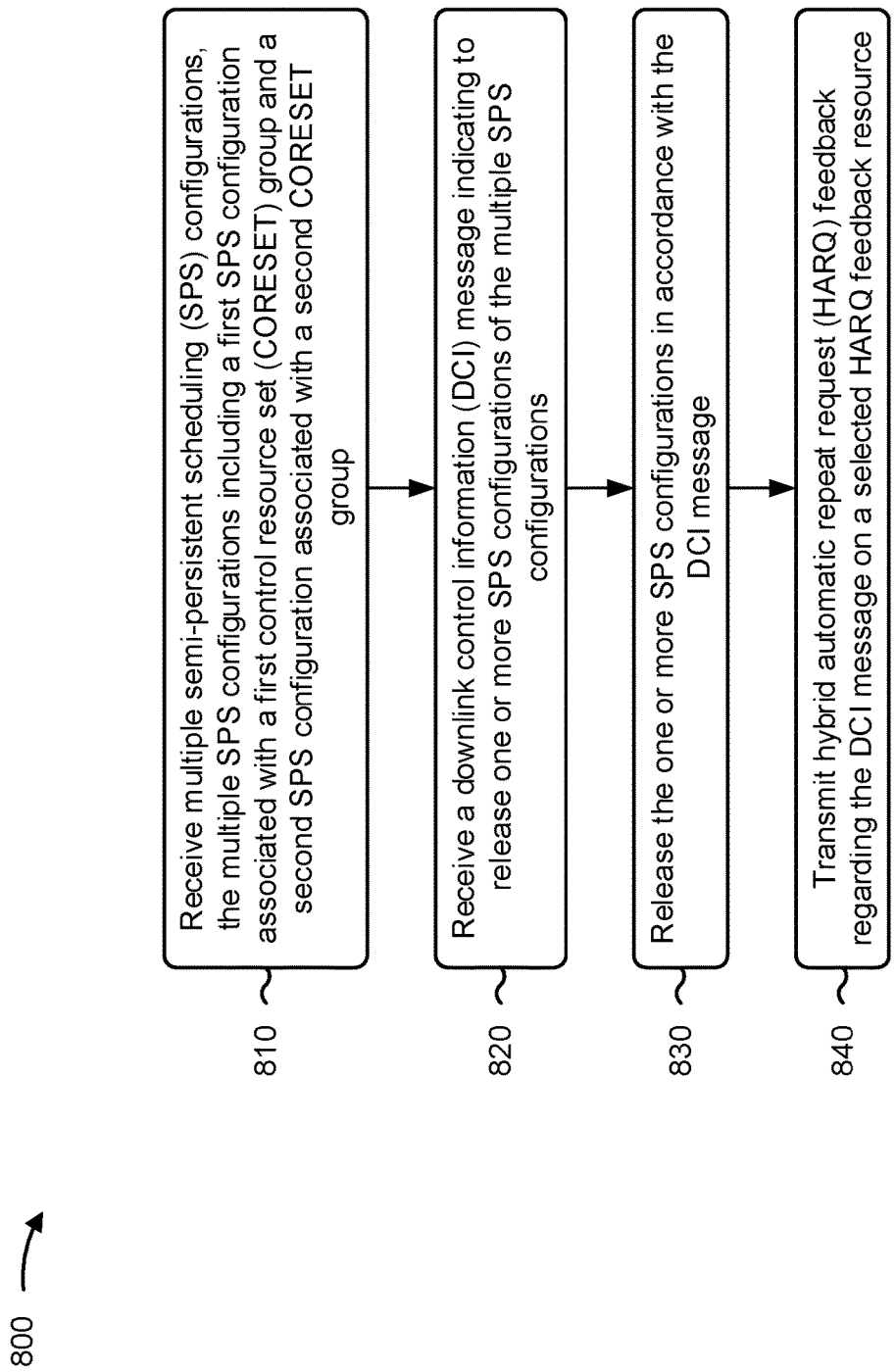
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with HARQ acknowledgment for SPS release DCI.

As shown in FIG. 8, in some aspects, process 800 may include receiving multiple SPS configurations, the multiple SPS configurations including a first SPS configuration associated with a first CORESET group and a second SPS configuration associated with a second CORESET group (block 810). For example, the UE (e.g., using communication manager 140 and/or reception component 1002, depicted in FIG. 10) may receive multiple SPS configurations, the multiple SPS configurations including a first SPS configuration associated with a first CORESET group and a second SPS configuration associated with a second CORESET group, as described above.

As further shown in FIG. 8, in some aspects, process 800 may include receiving a DCI message indicating to release one or more SPS configurations of the multiple SPS configurations (block 820). For example, the UE (e.g., using communication manager 140 and/or reception component 1002, depicted in FIG. 10) may receive a DCI message indicating to release one or more SPS configurations of the multiple SPS configurations, as described above.

As further shown in FIG. 8, in some aspects, process 800 may include releasing the one or more SPS configurations in accordance with the DCI message (block 830). For example, the UE (e.g., using communication manager 140 and/or SPS component 1008, depicted in FIG. 10) may release the one or more SPS configurations in accordance with the DCI message, as described above.

As further shown in FIG. 8, in some aspects, process 800 may include transmitting HARQ feedback regarding the DCI message on a selected HARQ feedback resource (block 840). For example, the UE (e.g., using communication manager 140 and/or transmission component 1004, depicted in FIG. 10) may transmit HARQ feedback regarding the DCI message on a selected HARQ feedback resource, as described above.

Process 800 may include additional aspects, such as any single aspect or any combination of aspects described below and/or in connection with one or more other processes described elsewhere herein.

In a first aspect, releasing the one or more SPS configurations comprises releasing all of the multiple SPS configurations.

In a second aspect, alone or in combination with the first aspect, the multiple SPS configurations include at least one SPS configuration mapped to a first HARQ codebook associated with a first priority and at least one SPS configuration mapped to a second HARQ codebook associated with a second priority.

In a third aspect, alone or in combination with one or more of the first and second aspects, the at least one SPS configuration mapped to the first HARQ codebook is associated with the first CORESET group and the at least one SPS configuration mapped to the second HARQ codebook is associated with the second CORESET group.

In a fourth aspect, alone or in combination with one or more of the first through third aspects, the selected HARQ feedback resource is associated with one of the first CORESET group or the second CORESET group.

In a fifth aspect, alone or in combination with one or more of the first through fourth aspects, the one of the first CORESET group or the second CORESET group associated with the selected HARQ feedback resource is fixed.

In a sixth aspect, alone or in combination with one or more of the first through fifth aspects, the one of the first CORESET group or the second CORESET group associated with the selected HARQ feedback resource is associated with a lowest or a highest CORESET pool index.

In a seventh aspect, alone or in combination with one or more of the first through sixth aspects, a location in a semi-static HARQ codebook for the HARQ feedback is the same as for a corresponding SPS reception with a lowest SPS configuration index among one or more SPS configurations, of the multiple SPS configurations, that are associated with the one of the first CORESET group or the second CORESET group.

In an eighth aspect, alone or in combination with one or more of the first through seventh aspects, the selected HARQ feedback resource includes a first PUCCH resource associated with the first CORESET group and a second PUCCH resource associated with the second CORESET group.

In a ninth aspect, alone or in combination with one or more of the first through eighth aspects, the HARQ feedback includes a first semi-static HARQ codebook reported on the first PUCCH resource and a second semi-static HARQ codebook reported on the second PUCCH resource.

In a tenth aspect, alone or in combination with one or more of the first through ninth aspects, a location, in the first semi-static HARQ codebook, for the HARQ feedback is the same as for a corresponding SPS reception with a lowest SPS configuration index among one or more SPS configurations, of the multiple SPS configurations, associated with the first CORESET group, and a location, in the second semi-static HARQ codebook, for the HARQ feedback is the same as for a corresponding SPS reception with a lowest SPS configuration index among another one or more SPS configurations, of the multiple SPS configurations, associated with the second CORESET group.

In an eleventh aspect, alone or in combination with one or more of the first through tenth aspects, releasing the one or more SPS configurations comprises releasing a subset of the multiple SPS configurations, wherein the subset corresponds to a selected CORESET group of the first CORESET group or the second CORESET group.

In a twelfth aspect, alone or in combination with one or more of the first through eleventh aspects, the selected HARQ feedback resource is associated with the selected CORESET group.

In a thirteenth aspect, alone or in combination with one or more of the first through twelfth aspects, the DCI message can release only SPS configurations of a CORESET group on which the DCI message is received.

In a fourteenth aspect, alone or in combination with one or more of the first through thirteenth aspects, the DCI message is received on the selected CORESET group.

In a fifteenth aspect, alone or in combination with one or more of the first through fourteenth aspects, the subset of the multiple SPS configurations are released in accordance with an SPS configuration deactivation state, wherein the SPS configuration deactivation state is mapped to the subset of the multiple SPS configurations.

In a sixteenth aspect, alone or in combination with one or more of the first through fifteenth aspects, a location in a semi-static HARQ codebook for the HARQ feedback is the same as for a corresponding SPS reception with a lowest SPS configuration index among the subset of the multiple SPS configurations.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
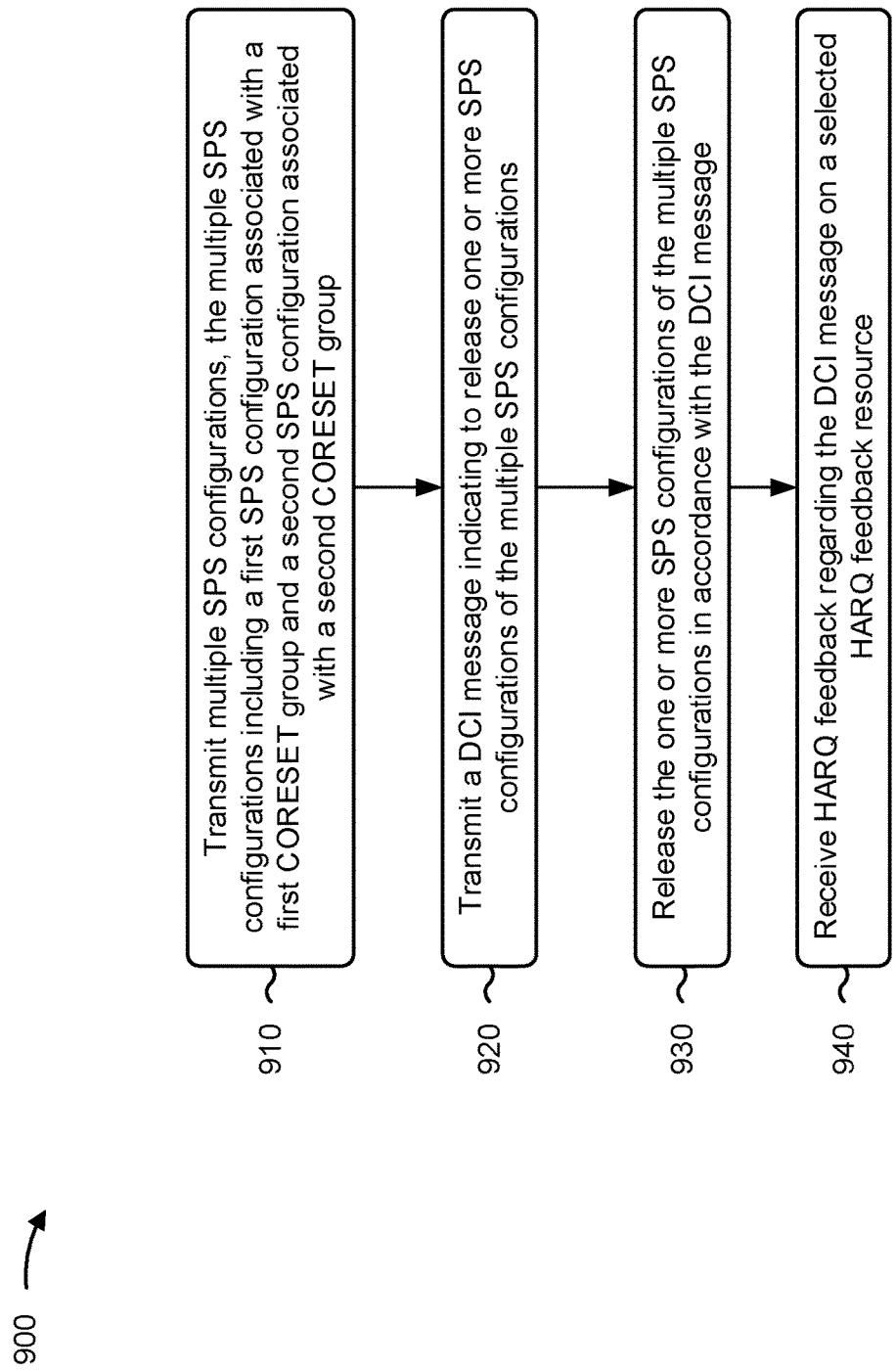
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station 110) performs operations associated with HARQ acknowledgment for SPS release DCI.

As shown in FIG. 9, in some aspects, process 900 may include transmitting multiple SPS configurations, the multiple SPS configurations including a first SPS configuration associated with a first CORESET group and a second SPS configuration associated with a second CORESET group (block 910). For example, the base station (e.g., using communication manager 150 and/or transmission component 1104, depicted in FIG. 11) may transmit multiple SPS configurations, the multiple SPS configurations including a first SPS configuration associated with a first CORESET group and a second SPS configuration associated with a second CORESET group, as described above.

As further shown in FIG. 9, in some aspects, process 900 may include transmitting a DCI message indicating to release one or more SPS configurations of the multiple SPS configurations (block 920). For example, the base station (e.g., using communication manager 150 and/or transmission component 1104, depicted in FIG. 11) may transmit a DCI message indicating to release one or more SPS configurations of the multiple SPS configurations, as described above.

As further shown in FIG. 9, in some aspects, process 900 may include releasing the one or more SPS configurations of the multiple SPS configurations in accordance with the DCI message (block 930). For example, the base station (e.g., using communication manager 150 and/or SPS component 1108, depicted in FIG. 11) may release the one or more SPS configurations of the multiple SPS configurations in accordance with the DCI message, as described above.

As further shown in FIG. 9, in some aspects, process 900 may include receiving HARQ feedback regarding the DCI message on a selected HARQ feedback resource (block 940). For example, the base station (e.g., using communication manager 150 and/or reception component 1102, depicted in FIG. 11) may receive HARQ feedback regarding the DCI message on a selected HARQ feedback resource, as described above.

Process 900 may include additional aspects, such as any single aspect or any combination of aspects described below and/or in connection with one or more other processes described elsewhere herein.

In a first aspect, releasing the one or more SPS configurations comprises releasing all of the multiple SPS configurations.

In a second aspect, alone or in combination with the first aspect, the multiple SPS configurations include at least one SPS configuration mapped to a first HARQ codebook associated with a first priority and at least one SPS configuration mapped to a second HARQ codebook associated with a second priority.

In a third aspect, alone or in combination with one or more of the first and second aspects, the at least one SPS configuration mapped to the first HARQ codebook is associated with the first CORESET group and the at least one SPS configuration mapped to the second HARQ codebook is associated with the second CORESET group.

In a fourth aspect, alone or in combination with one or more of the first through third aspects, the selected HARQ feedback resource is associated with one of the first CORESET group or the second CORESET group.

In a fifth aspect, alone or in combination with one or more of the first through fourth aspects, the one of the first CORESET group or the second CORESET group associated with the selected HARQ feedback resource is fixed.

In a sixth aspect, alone or in combination with one or more of the first through fifth aspects, the one of the first CORESET group or the second CORESET group associated with the selected HARQ feedback resource is associated with a lowest or a highest CORESET pool index.

In a seventh aspect, alone or in combination with one or more of the first through sixth aspects, a location in a semi-static HARQ codebook for the HARQ feedback is the same as for a corresponding SPS reception with a lowest SPS configuration index among one or more SPS configurations, of the multiple SPS configurations, that are associated with the one of the first CORESET group or the second CORESET group.

In an eighth aspect, alone or in combination with one or more of the first through seventh aspects, the selected HARQ feedback resource includes a first PUCCH resource associated with the first CORESET group and a second PUCCH resource associated with the second CORESET group.

In a ninth aspect, alone or in combination with one or more of the first through eighth aspects, the HARQ feedback includes a first semi-static HARQ codebook reported on the first PUCCH resource and a second semi-static HARQ codebook reported on the second PUCCH resource.

In a tenth aspect, alone or in combination with one or more of the first through ninth aspects, a location, in the first semi-static HARQ codebook, for the HARQ feedback is the same as for a corresponding SPS reception with a lowest SPS configuration index among one or more SPS configurations, of the multiple SPS configurations, associated with the first CORESET group, and a location, in the second semi-static HARQ codebook, for the HARQ feedback is the same as for a corresponding SPS reception with a lowest SPS configuration index among another one or more SPS configurations, of the multiple SPS configurations, associated with the second CORESET group.

In an eleventh aspect, alone or in combination with one or more of the first through tenth aspects, releasing the one or more SPS configurations comprises releasing a subset of the multiple SPS configurations, wherein the subset corresponds to a selected CORESET group of the first CORESET group or the second CORESET group.

In a twelfth aspect, alone or in combination with one or more of the first through eleventh aspects, the selected HARQ feedback resource is associated with the selected CORESET group.

In a thirteenth aspect, alone or in combination with one or more of the first through twelfth aspects, the DCI message can release only SPS configurations of a CORESET group on which the DCI message is received.

In a fourteenth aspect, alone or in combination with one or more of the first through thirteenth aspects, the DCI message is received on the selected CORESET group.

In a fifteenth aspect, alone or in combination with one or more of the first through fourteenth aspects, the subset of the multiple SPS configurations are released in accordance with an SPS configuration deactivation state, wherein the SPS configuration deactivation state is mapped to the subset of the multiple SPS configurations.

In a sixteenth aspect, alone or in combination with one or more of the first through fifteenth aspects, a location in a semi-static HARQ codebook for the HARQ feedback is the same as for a corresponding SPS reception with a lowest SPS configuration index among the subset of the multiple SPS configurations.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
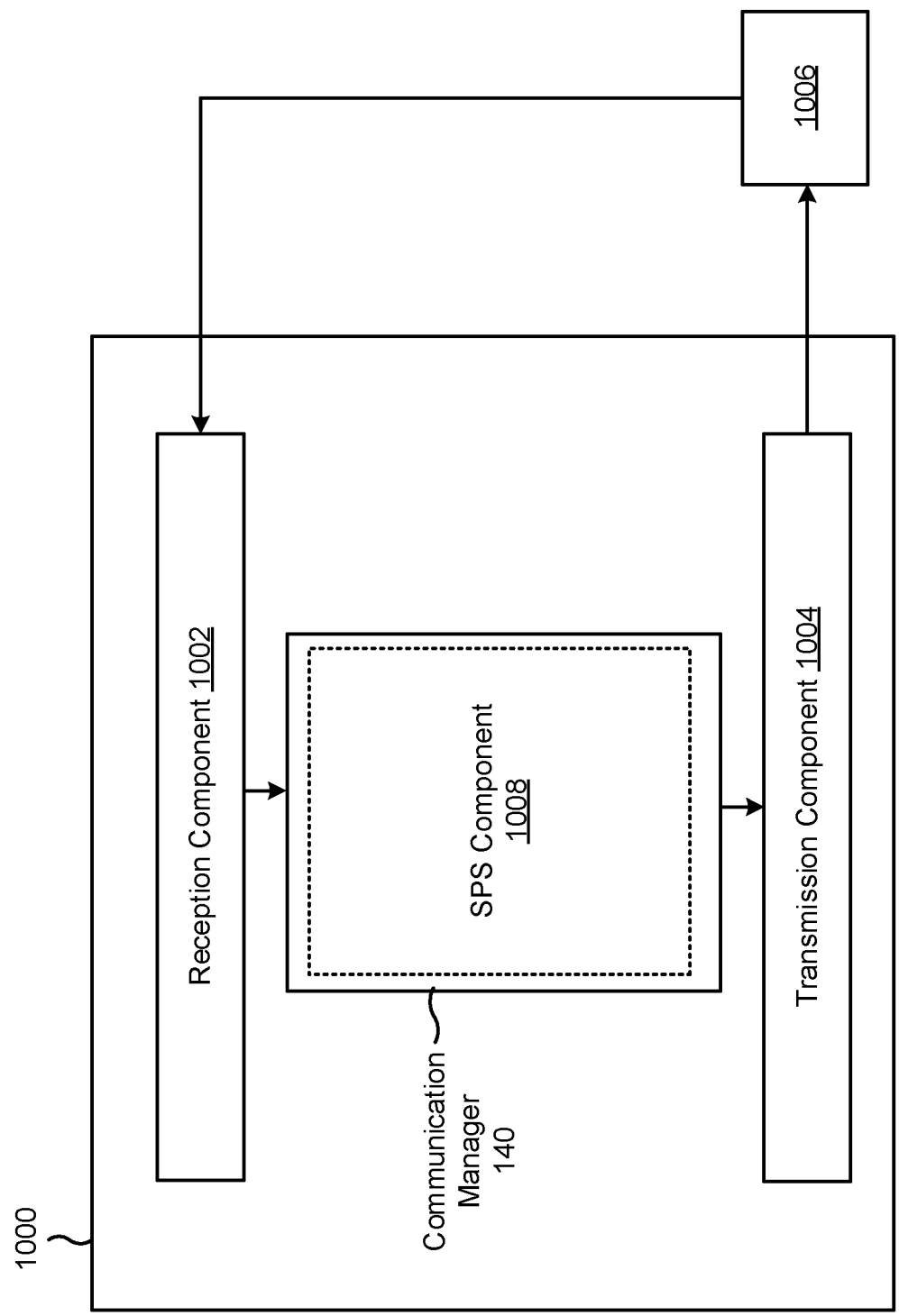
FIG. 10 is a block diagram of an example apparatus for wireless communication, in accordance with the present disclosure.

FIG. 10 is a block diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include an SPS component 1008, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive multiple SPS configurations, the multiple SPS configurations including a first SPS configuration associated with a first CORESET group and a second SPS configuration associated with a second CORESET group. The reception component 1002 may receive a DCI message indicating to release one or more SPS configurations of the multiple SPS configurations. The SPS component 1008 may release the one or more SPS configurations in accordance with the DCI message. The transmission component 1004 may transmit HARQ feedback regarding the DCI message on a selected HARQ feedback resource.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
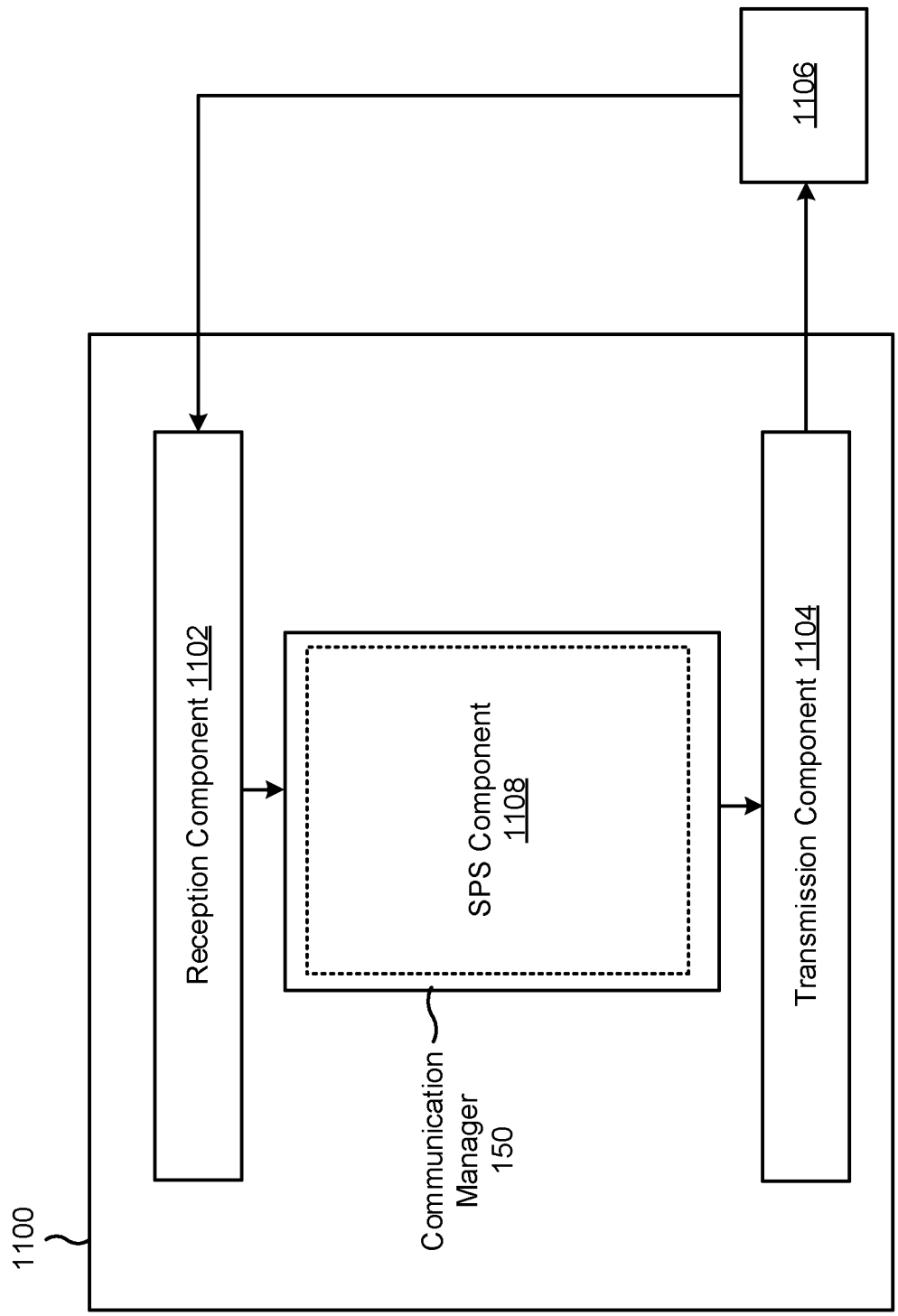
FIG. 11 is a block diagram of an example apparatus for wireless communication, in accordance with the present disclosure.

FIG. 11 is a block diagram of an example apparatus 1100 for wireless communication, in accordance with the present disclosure. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include an SPS component 1108, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The transmission component 1104 may transmit multiple SPS configurations, the multiple SPS configurations including a first SPS configuration associated with a first CORESET group and a second SPS configuration associated with a second CORESET group. The transmission component 1104 may transmit a DCI message indicating to release one or more SPS configurations of the multiple SPS configurations. The SPS component 1108 may release the one or more SPS configurations of the multiple SPS configurations in accordance with the DCI message. The reception component 1102 may receive HARQ feedback regarding the DCI message on a selected HARQ feedback resource.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving multiple semi-persistent scheduling (SPS) configurations, the multiple SPS configurations including a first SPS configuration associated with a first control resource set (CORESET) group and a second SPS configuration associated with a second CORESET group; receiving a downlink control information (DCI) message indicating to release one or more SPS configurations of the multiple SPS configurations; releasing the one or more SPS configurations in accordance with the DCI message; and transmitting hybrid automatic repeat request (HARQ) feedback regarding the DCI message on a selected HARQ feedback resource.

Aspect 2: The method of Aspect 1, wherein releasing the one or more SPS configurations comprises: releasing all of the multiple SPS configurations.

Aspect 3: The method of Aspect 2, wherein the multiple SPS configurations include at least one SPS configuration mapped to a first HARQ codebook associated with a first priority and at least one SPS configuration mapped to a second HARQ codebook associated with a second priority.

Aspect 4: The method of Aspect 3, wherein the at least one SPS configuration mapped to the first HARQ codebook is associated with the first CORESET group and the at least one SPS configuration mapped to the second HARQ codebook is associated with the second CORESET group.

Aspect 5: The method of Aspect 1, wherein the selected HARQ feedback resource is associated with one of the first CORESET group or the second CORESET group.

Aspect 6: The method of Aspect 5, wherein the one of the first CORESET group or the second CORESET group associated with the selected HARQ feedback resource is fixed.

Aspect 7: The method of Aspect 5, wherein the one of the first CORESET group or the second CORESET group associated with the selected HARQ feedback resource is associated with a lowest or a highest CORESET pool index.

Aspect 8: The method of Aspect 5, wherein a location in a semi-static HARQ codebook for the HARQ feedback is the same as for a corresponding SPS reception with a lowest SPS configuration index among one or more SPS configurations, of the multiple SPS configurations, that are associated with the one of the first CORESET group or the second CORESET group.

Aspect 9: The method of Aspect 1, wherein the selected HARQ feedback resource includes a first physical uplink control channel (PUCCH) resource associated with the first CORESET group and a second PUCCH resource associated with the second CORESET group.

Aspect 10: The method of Aspect 9, wherein the HARQ feedback includes a first semi-static HARQ codebook reported on the first PUCCH resource and a second semi-static HARQ codebook reported on the second PUCCH resource.

Aspect 11: The method of Aspect 10, wherein a location, in the first semi-static HARQ codebook, for the HARQ feedback is the same as for a corresponding SPS reception with a lowest SPS configuration index among one or more SPS configurations, of the multiple SPS configurations, associated with the first CORESET group, and wherein a location, in the second semi-static HARQ codebook, for the HARQ feedback is the same as for a corresponding SPS reception with a lowest SPS configuration index among another one or more SPS configurations, of the multiple SPS configurations, associated with the second CORESET group.

Aspect 12: The method of Aspect 1, wherein releasing the one or more SPS configurations comprises: releasing a subset of the multiple SPS configurations, wherein the subset corresponds to a selected CORESET group of the first CORESET group or the second CORESET group.

Aspect 13: The method of Aspect 12, wherein the selected HARQ feedback resource is associated with the selected CORESET group.

Aspect 14: The method of Aspect 12, wherein the DCI message can release only SPS configurations of a CORESET group on which the DCI message is received.

Aspect 15: The method of Aspect 12, wherein the DCI message is received on the selected CORESET group.

Aspect 16: The method of Aspect 12, wherein the subset of the multiple SPS configurations are released in accordance with an SPS configuration deactivation state, wherein the SPS configuration deactivation state is mapped to the subset of the multiple SPS configurations.

Aspect 17: The method of Aspect 12, wherein a location in a semi-static HARQ codebook for the HARQ feedback is the same as for a corresponding SPS reception with a lowest SPS configuration index among the subset of the multiple SPS configurations.

Aspect 18: A method of wireless communication performed by a base station, comprising: transmitting multiple semi-persistent scheduling (SPS) configurations, the multiple SPS configurations including a first SPS configuration associated with a first control resource set (CORESET) group and a second SPS configuration associated with a second CORESET group; transmitting a downlink control information (DCI) message indicating to release one or more SPS configurations of the multiple SPS configurations; releasing the one or more SPS configurations of the multiple SPS configurations in accordance with the DCI message; and receiving hybrid automatic repeat request (HARQ) feedback regarding the DCI message on a selected HARQ feedback resource.

Aspect 19: The method of Aspect 18, wherein releasing the one or more SPS configurations comprises: releasing all of the multiple SPS configurations.

Aspect 20: The method of Aspect 19, wherein the multiple SPS configurations include at least one SPS configuration mapped to a first HARQ codebook associated with a first priority and at least one SPS configuration mapped to a second HARQ codebook associated with a second priority.

Aspect 21: The method of Aspect 20, wherein the at least one SPS configuration mapped to the first HARQ codebook is associated with the first CORESET group and the at least one SPS configuration mapped to the second HARQ codebook is associated with the second CORESET group.

Aspect 22: The method of Aspect 18, wherein the selected HARQ feedback resource is associated with one of the first CORESET group or the second CORESET group.

Aspect 23: The method of Aspect 22, wherein the one of the first CORESET group or the second CORESET group associated with the selected HARQ feedback resource is fixed.

Aspect 24: The method of Aspect 22, wherein the one of the first CORESET group or the second CORESET group associated with the selected HARQ feedback resource is associated with a lowest or a highest CORESET pool index.

Aspect 25: The method of Aspect 22, wherein a location in a semi-static HARQ codebook for the HARQ feedback is the same as for a corresponding SPS reception with a lowest SPS configuration index among one or more SPS configurations, of the multiple SPS configurations, that are associated with the one of the first CORESET group or the second CORESET group.

Aspect 26: The method of Aspect 18, wherein the selected HARQ feedback resource includes a first physical uplink control channel (PUCCH) resource associated with the first CORESET group and a second PUCCH resource associated with the second CORESET group.

Aspect 27: The method of Aspect 26, wherein the HARQ feedback includes a first semi-static HARQ codebook reported on the first PUCCH resource and a second semi-static HARQ codebook reported on the second PUCCH resource.

Aspect 28: The method of Aspect 27, wherein a location, in the first semi-static HARQ codebook, for the HARQ feedback is the same as for a corresponding SPS reception with a lowest SPS configuration index among one or more SPS configurations, of the multiple SPS configurations, associated with the first CORESET group, and wherein a location, in the second semi-static HARQ codebook, for the HARQ feedback is the same as for a corresponding SPS reception with a lowest SPS configuration index among another one or more SPS configurations, of the multiple SPS configurations, associated with the second CORESET group.

Aspect 29: The method of Aspect 18, wherein releasing the one or more SPS configurations comprises: releasing a subset of the multiple SPS configurations, wherein the subset corresponds to a selected CORESET group of the first CORESET group or the second CORESET group.

Aspect 30: The method of Aspect 29, wherein the selected HARQ feedback resource is associated with the selected CORESET group.

Aspect 31: The method of Aspect 29, wherein the DCI message can release only SPS configurations of a CORESET group on which the DCI message is received.

Aspect 32: The method of Aspect 29, wherein the DCI message is received on the selected CORESET group.

Aspect 33: The method of Aspect 29, wherein the subset of the multiple SPS configurations are released in accordance with an SPS configuration deactivation state, wherein the SPS configuration deactivation state is mapped to the subset of the multiple SPS configurations.

Aspect 34: The method of Aspect 29, wherein a location in a semi-static HARQ codebook for the HARQ feedback is the same as for a corresponding SPS reception with a lowest SPS configuration index among the subset of the multiple SPS configurations.

Aspect 35: An apparatus for wireless communication at a device, comprising a processor; memory coupled with the processor; and instructions stored in the memory and executable by the processor to cause the apparatus to perform the method of one or more Aspects of Aspects 1-34.

Aspect 36: A device for wireless communication, comprising a memory and one or more processors coupled to the memory, the memory and the one or more processors configured to perform the method of one or more Aspects of Aspects 1-34.

Aspect 37: An apparatus for wireless communication, comprising at least one means for performing the method of one or more Aspects of Aspects 1-34.

Aspect 38: A non-transitory computer-readable medium storing code for wireless communication, the code comprising instructions executable by a processor to perform the method of one or more Aspects of Aspects 1-34.

Aspect 39: A non-transitory computer-readable medium storing a set of instructions for wireless communication, the set of instructions comprising one or more instructions that, when executed by one or more processors of a device, cause the device to perform the method of one or more Aspects of Aspects 1-34.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors coupled to the one or more memories, the one or more memories comprising instructions executable by the one or more processors to cause the UE to:
receive, from a network entity associated with a first transmit receive point (TRP) and a second TRP, multiple semi-persistent scheduling (SPS) configurations,
the multiple SPS configurations including:
a first SPS configuration associated with a first control resource set (CORESET) group corresponding to the first transmit receive point (TRP), and
a second SPS configuration associated with a second CORESET group corresponding to the second TRP, and
the network entity being different from the first TRP and the second TRP;
receive, from the network entity, a single downlink control information (DCI) message indicating to release the multiple SPS configurations;
release the multiple SPS configurations in accordance with the single DCI message; and
transmit, to the network entity and on a selected hybrid automatic repeat request (HARQ) feedback resource, HARQ feedback, regarding the single DCI message, associated with a selected CORESET group that is either the first CORESET group or the second CORESET group,
wherein the selected CORESET group is based at least in part on either:
the selected HARQ feedback resource comprising a single physical uplink control channel (PUCCH) resource comprising either a first fixed value associated with the first CORESET group or a second fixed value associated with the second CORESET group, or
a comparison of an index value of the first SPS configuration to an index value of the second SPS configuration.

2. The apparatus of claim 1, wherein the multiple SPS configurations include at least one SPS configuration mapped to a first HARQ codebook associated with a first priority and at least one SPS configuration mapped to a second HARQ codebook associated with a second priority.

3. The apparatus of claim 2, wherein the at least one SPS configuration mapped to the first HARQ codebook is associated with the first CORESET group and the at least one SPS configuration mapped to the second HARQ codebook is associated with the second CORESET group.

4. The apparatus of claim 1, wherein the selected HARQ feedback resource is the single PUCCH resource.

5. The apparatus of claim 1, wherein the selected CORESET value is based at least in part on the comparison of the index value of the first SPS configuration to the index value of the second SPS configuration.

6. The apparatus of claim 1, wherein a location in a semi-static HARQ codebook for the HARQ feedback is the same as for a corresponding SPS reception with a lowest index value among the index value of the first SPS configuration and the index value of the second SPS configuration.

7. The apparatus of claim 4, wherein the single PUCCH resource is a first single PUCCH resource comprising the first fixed value associated with the first CORESET group, wherein the selected HARQ feedback resource comprises the first single PUCCH resource and a second single PUCCH resource, wherein the second single PUCCH resource comprises the second fixed value associated with the second CORESET group.

8. The apparatus of claim 7, wherein the HARQ feedback includes a first semi-static HARQ codebook reported on the first single PUCCH resource and a second semi-static HARQ codebook reported on the second single PUCCH resource.

9. The apparatus of claim 8, wherein a location, in the first semi-static HARQ codebook, for the HARQ feedback is the same as for a corresponding SPS reception with a lowest index value among one or more SPS configurations, of the multiple SPS configurations, associated with the first CORESET group and including the first SPS configuration, and wherein a location, in the second semi-static HARQ codebook, for the HARQ feedback is the same as for a corresponding SPS reception with a lowest index value among another one or more SPS configurations, of the multiple SPS configurations, associated with the second single PUCCH resource and including the second SPS configuration.

10. An apparatus for wireless communication at a network entity, comprising:
one or more memories; and
one or more processors coupled to the one or more memories, the one or more memories comprising instructions executable by the one or more processors to cause the network entity to:
transmit, to a user equipment (UE), multiple semi-persistent scheduling (SPS) configurations, the multiple SPS configurations including:
a first SPS configuration associated with a first control resource set (CORESET) group corresponding to a first transmit receive point (TRP) associated with the network entity, and
a second SPS configuration associated with a second CORESET group corresponding to a second TRP associated with the network entity,
the network entity being different from the first TRP and the second TRP;
transmit, to the UE, a single downlink control information (DCI) message indicating to release the multiple SPS configurations;
release the multiple SPS configurations in accordance with the single DCI message; and
receive, from the UE and on a selected hybrid automatic repeat request (HARQ) feedback resource, HARQ feedback regarding the single DCI message, associated with a selected CORESET group that is either the first CORESET group or the second CORESET group,
wherein the selected CORESET group is based at least in part on either:
the selected HARQ feedback resource comprising a single physical uplink control channel (PUCCH) resource comprising either a first fixed value associated with the first CORESET group or a second fixed value associated with the second CORESET group, or
a comparison of an index value of the first SPS configuration to an index value of the second SPS configuration.

11. The apparatus of claim 10, wherein the selected HARQ feedback resource is the single PUCCH resource.

12. The apparatus of claim 11, wherein the single PUCCH resource is a first single PUCCH resource comprising the first fixed value associated with the first CORESET group, wherein the selected HARQ feedback resource comprises the first single PUCCH resource and a second single PUCCH resource, wherein the second single PUCCH resource comprises the second fixed value associated with the second CORESET group.

13. The apparatus of claim 12, wherein the HARQ feedback includes a first semi-static HARQ codebook reported on the first single PUCCH resource and a second semi-static HARQ codebook reported on the second single PUCCH resource.

14. The apparatus of claim 10, wherein the multiple SPS configurations include at least one SPS configuration mapped to a first HARQ codebook associated with a first priority and at least one SPS configuration mapped to a second HARQ codebook associated with a second priority.

15. The apparatus of claim 14, wherein the at least one SPS configuration mapped to the first HARQ codebook is associated with the first CORESET group and the at least one SPS configuration mapped to the second HARQ codebook is associated with the second CORESET group.

16. The apparatus of claim 10, wherein the selected CORESET value is based at least in part on the comparison of the index value of the first SPS configuration to the index value of the second SPS configuration.

17. The apparatus of claim 10, wherein a location in a semi-static HARQ codebook for the HARQ feedback is the same as for a corresponding SPS reception with a lowest SPS index value among the index value of the first SPS configuration and the index value of the second SPS configuration.

18. A method of wireless communication performed by a user equipment (UE), comprising:
receiving from a network entity associated with a first transmit receive point (TRP) and a second TRP multiple semi-persistent scheduling (SPS) configurations, the multiple SPS configurations including:
a first SPS configuration associated with a first control resource set (CORESET) group corresponding to a first transmit receive point (TRP), and
a second SPS configuration associated with a second CORESET group corresponding to a second TRP, and
the network entity being different from the first TRP and the second TRP;
receiving, from the network entity, a single downlink control information (DCI) message indicating to release the multiple SPS configurations;
releasing the multiple SPS configurations in accordance with the single DCI message; and
transmitting, to the network entity and on a selected hybrid automatic repeat request (HARQ) feedback resource, HARQ feedback regarding the single DCI message, associated with a selected CORESET group that is either the first CORESET group or the second CORESET group,
wherein the selected CORESET group is based at least in part on either:
the selected HARQ feedback resource a single physical uplink control channel (PUCCH) resource comprising either a first fixed value associated with the first CORESET group or a second fixed value associated with the second CORESET group, or
a comparison of an index value of the first SPS configuration to an index value of the second SPS configuration.

19. The method of claim 18, wherein the selected HARQ feedback resource comprises single PUCCH resource.

20. The method of claim 19, wherein the single PUCCH resource is a first single PUCCH resource comprising the first fixed value associated with the first CORESET group, wherein the selected HARQ feedback resource comprises the first single PUCCH resource and a second single PUCCH resource, wherein the second single PUCCH resource comprises the second fixed value associated with the second CORESET group.

21. The method of claim 20, wherein the HARQ feedback includes a first semi-static HARQ codebook reported on the first single PUCCH resource and a second semi-static HARQ codebook reported on the second single PUCCH resource.

22. The method of claim 18, wherein the multiple SPS configurations include at least one SPS configuration mapped to a first HARQ codebook associated with a first priority and at least one SPS configuration mapped to a second HARQ codebook associated with a second priority.

23. The method of claim 22, wherein the at least one SPS configuration mapped to the first HARQ codebook is associated with the first CORESET group and the at least one SPS configuration mapped to the second HARQ codebook is associated with the second CORESET group.

24. The method of claim 18, wherein the selected CORESET value is based at least in part on the comparison of the index value of the first SPS configuration to the index value of the second SPS configuration.

25. The method of claim 18, wherein a location in a semi-static HARQ codebook for the HARQ feedback is the same as for a corresponding SPS reception with a lowest index value among the index value of the first SPS configuration and the index value of the second SPS configuration.

26. A method of wireless communication performed by a network entity, comprising:
transmitting, to a user equipment (UE), multiple semi-persistent scheduling (SPS) configurations, the multiple SPS configurations including:
a first SPS configuration associated with a first control resource set (CORESET) group corresponding to a first transmit receive point (TRP) associated with the network entity, and
a second SPS configuration associated with a second CORESET group corresponding to a second TRP associated with the network entity,
the network entity being different form the first TRP and the second TRP;
transmitting, to the UE, a single downlink control information (DCI) message indicating to release the multiple SPS configurations;
releasing the multiple SPS configurations in accordance with the single DCI message; and
receiving, from the UE and on a selected hybrid automatic repeat request (HARQ) feedback resource, HARQ feedback regarding the single DCI message, associated with a selected CORESET group that is either the first CORESET group or the second CORESET group,
wherein the selected CORESET group is based at least in part on either:

the selected HARQ feedback resource comprising a single physical uplink control channel (PUCCH) resource comprising either a first fixed value associated with the first CORESET group or a second fixed value associated with the second CORESET group, or a comparison of an index value of the first SPS configuration to an index value of the second SPS configuration.

27. The method of claim 26, wherein the selected HARQ feedback resource is the single PUCCH resource.

28. The method of claim 26, wherein the multiple SPS configurations include at least one SPS configuration mapped to a first HARQ codebook associated with a first priority and at least one SPS configuration mapped to a second HARQ codebook associated with a second priority.

29. The method of claim 28, wherein the at least one SPS configuration mapped to the first HARQ codebook is associated with the first CORESET group and the at least one SPS configuration mapped to the second HARQ codebook is associated with the second CORESET group.

30. The method of claim 26, wherein at least one of:

the selected CORESET value is based at least in part on the comparison of the index value of the first SPS configuration to the index value of the second SPS configuration, or a location in a semi-static HARQ codebook for the HARQ feedback is the same as for a corresponding SPS reception with a lowest SPS index value among the index value of the first SPS configuration and the index value of the second SPS configuration.

\* \* \* \* \*